United States Patent [19]

Goodell et al.

[11] 4,418,737
[45] Dec. 6, 1983

[54] AUTOMATIC TIRE INFLATION SYSTEM

[75] Inventors: Fred L. Goodell, Grosse Ilse; Michael J. Ellison, Canton, both of Mich.

[73] Assignee: AM General Corporation, Detroit, Mich.

[21] Appl. No.: 288,834

[22] Filed: Jul. 31, 1981

[51] Int. Cl.³ .............................................. B60C 29/00
[52] U.S. Cl. .................................... 152/416; 137/224; 137/625.68; 152/417
[58] Field of Search ........................ 152/416, 417, 427; 137/224, 224.5, 225, 488, 492.5, 625.66, 625.68

[56] References Cited

U.S. PATENT DOCUMENTS

| | | | |
|---|---|---|---|
| 1,800,780 | 4/1931 | Daneel | 152/417 |
| 2,577,458 | 12/1951 | Gaiptman | 152/416 |
| 2,634,782 | 4/1953 | Turek et al. | 152/417 |
| 2,634,783 | 4/1953 | Turek et al. | 152/417 |
| 2,685,906 | 8/1954 | Williams | 152/417 |
| 2,693,841 | 11/1954 | Webster, Jr. | 152/417 |
| 2,715,430 | 8/1955 | Lindeman | 152/416 |
| 2,849,047 | 7/1958 | Lamot et al. | 152/417 |
| 2,944,579 | 7/1960 | Kamm et al. | 152/416 |
| 2,976,906 | 3/1961 | Kamm et al. | 152/417 |
| 3,362,452 | 1/1968 | Harnish | 152/416 |
| 3,705,614 | 12/1972 | Juttner et al. | 152/417 |
| 4,019,552 | 4/1977 | Tsuruta | 152/417 |
| 4,154,279 | 5/1979 | Tsuruta | 152/416 |
| 4,313,483 | 2/1982 | Brockmann | 152/416 |

Primary Examiner—William A. Powell
Assistant Examiner—Thomas Bokan
Attorney, Agent, or Firm—Krass, Young & Schivley

[57] ABSTRACT

An automatic tire inflation system for a vehicle (10) includes a plurality of wheel assemblies (14). Each wheel assembly includes a rotatable portion (30) connected to its associated tire (16) and a non-rotatable portion (24) connected to the vehicle chassis (28). A sealed air passageway is provided between an inlet (62) in the non-rotatable portion and an outlet (64) in the rotatable portion of the wheel assembly which is connected to the tire. The sealed air passageway is provided in part by way of a longitudinally extending bore (66) in the spindle (24) which communicates with a chamber (60) defined by a sleeve (42) and a pair of air seals (52, 54) between the sleeve and spindle. A manually actuable selector device (102) in the vehicle is provided to permit the user to select one of a plurality of preset air pressure settings for the tires. An air regulating system quickly responds to the selected setting to automatically regulate the air pressure within the tires at the preset pressure associated with the selected setting of the selector device. A master-slave (166, 168) valving arrangement controlled by pilot air is preferably used to perform the inflation or deflation process.

14 Claims, 5 Drawing Figures

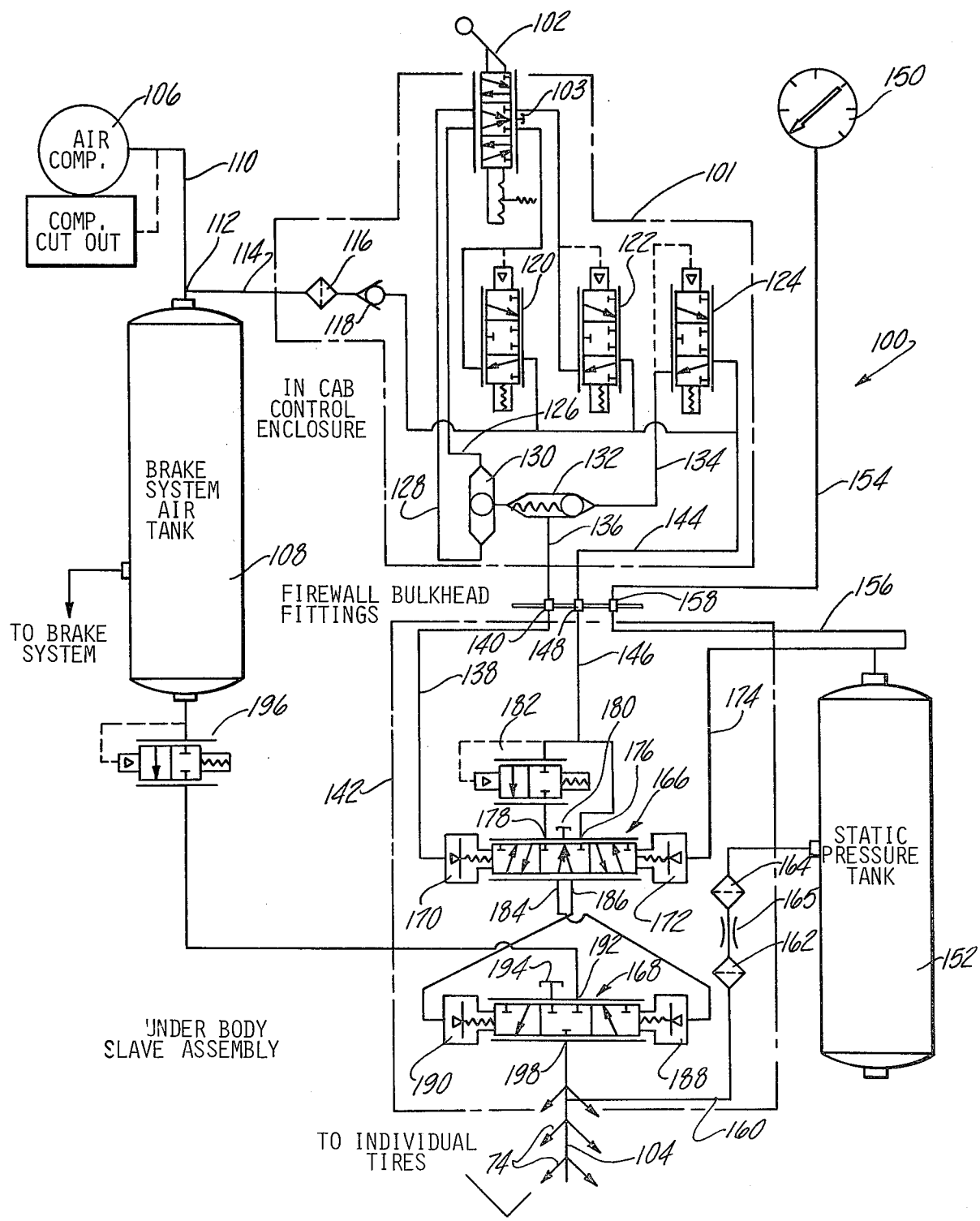

AUTOMATIC TIRE INFLATION SYSTEM

DESCRIPTION

Technical Field

This invention relates generally to tire inflation systems and, more particularly, to apparatus for automatically regulating the pressure in vehicular tires.

Background Art

It is well known that the traction of vehicles on soft terrain may be greatly improved by decreasing the pressure within the tires. By decreasing the pressure, the tire supporting surface will increase thereby enlarging the contact area between the tires and the terrain. Additionally, it is often desirable to decrease the tire pressure to increase riding comfort on rough roads. On the other hand, higher tire pressures decrease rolling resistance and tire carcass temperatures on smooth roads thereby increasing economy and safety.

It would be desirable to be able to adjust the pressure within the tires without having to stop the vehicle and manually inflate or deflate the tires. This is especially true for military vehicles which usually travel in columns, many times under conditions whereby stoppage of the vehicle would delay the entire column. Additionally, if the military vehicle is under enemy attack it is imperative that the vehicle maintain its maneuverability for as long as possible. If a tire has been punctured by gunfire or the like it is necessary to be able to at least partially inflate the tire very quickly so that the vehicle remains usable.

Various automatic tire inflation systems have been used in the past to alleviate one or more of these problems. One such system was standard equipment on U.S. Army vehicles known as the "Duk" which were used in World War II. This technique used a so-called Schrader valve system in which air pressure was supplied through long wand-like conduits which protruded from the vehicle wheel openings in the frame and fed air into rotating couplings connected to the exterior of the hubs. A second line from the inboard edge of the rotating couplings were connected to the valve stems in the inner-tubes for the tires.

One of the problems with this approach was its extreme vulnerability to damage since the conduits which carried the air were exposed to the rough terrain over which the vehicles passed. The conduits were subject to being broken or damaged by coming into contact with brush, rocks, or other vehicles.

In an attempt to improve upon this system there have been several reported attempts to provide an internal air pressure feed technique that would not be subject to such abuse. It is believed that some of the vehicles used in the U.S.S.R. and its satellite countries have used automatic tire inflation systems in which the air from the compressed air source is routed through the wheel assembly and into the tire. Additionally, the following U.S. Patents form a representative, but not exhaustive, list of various other approaches to automatic tire inflation systems: U.S. Pat. Nos. 2,693,841 to Webster, Jr.; 2,944,579 to Kamm et al; 2,634,783 to Turek et al; 2,577,458 to Gaiptman; 2,849,047 to Lamont et al; 3,362,452 to Harnish; 1,800,780 to Daneel; and 3,705,614 to Juttner et al.

One of the major drawbacks of these various approaches is that they generally require a substantial amount of operator attention to achieve the desired air pressure. For the most part, these systems require an operator to activate an inflate or deflate switch and then continually monitor an air pressure gauge until the desired pressure is reached at which time the operator must deactivate the switch. Moreover, no provision was made for accutately and automatically maintaining the tire pressure once initially set by this operation. These problems are especially acute when the vehicle is under enemy attack where the soldier's time could be much better spent in defending himself than in watching gauges.

A multitude of other problems can be expected from the prior art techniques used in the past. One common problem is that the prior art systems were not cost effective. Many of the military vehicles currently in use still have many years of useful lives left or they are still in production. In many instances it would be desirable to modify these vehicles to include an automatic tire inflation system. However, many of the prior art approaches are specifically designed for a particular application and cannot easily be incorporated into conventionally used military vehicles such as M809, M44A2 and M939 military trucks.

Also, the complexity of the prior art approaches with their relatively large number of components materially increases the likelihood of malfunctions. Many of the internal air feed wheel assemblies cut into load bearing members (e.g. axles, shafts) or relocate the bearings in order to obtain space for the sealed air passageway. They also were subject to dirt and other road elements which affects the life of the seals. Equally unsatisfactory is the prior art approach to controlling the inflate/deflate valve. In the past only one control valve was used which gradually opened or shut depending on the pressure differential between the desired and actual pressure within the tires. For example, as the pressure differential decreased the valve gradually shut off until there was equilibrium. Unfortunately, this technique unduly increased the inflate/deflate cycle time which is extremely important under battle conditions.

The present invention is directed to solving one or more of the problems set forth above.

Disclosure of the Invention

According to one aspect of the present invention, a unique control arrangement is provided for an automatic tire inflation system. A manually actuable selector device in the vehicle cab is provided for selecting one of a plurality of preset air pressure settings for the tires. An air regulating system, responsive to the selected setting, is provided for automatically regulating the air pressure within the tires to the preset pressure with a minimum amount of operator attention. All that the operator need do is to set the selector device to the preset setting and the system automatically inflates or deflates the tires, as necessary, and further maintains the selected pressure within the tires at all times even though there may be a change in conditions affecting the tire pressure such as punctures, temperature, etc.

In the preferred embodiment, the inflate/deflate valve assembly employs a master-slave combination of two shuttle valves, the slave being controlled by pilot air. The slave valve which controls the actual inflation or deflation is either completely open in one position or the other as the case may be depending upon the pressure differential between desired and current tire pressure applied to the master valve. The desired pressure is supplied by a set of fixed pressure regulators whose outputs are coupled to the master valve as a function of the selected position of a multi-position toggle valve that is mounted in the vehicle cabin. In response to pilot air on one control input, the slave valve shuttles to one completely open position to couple compressed air to the tires to inflate them until there is equilibrium between the control inputs of the master valve. Conversely, pilot air on the other control input of the slave valve operates to completely move it to another position to deflate the tires until equilibrium is reached in the master valve.

Another aspect of the invention includes a wheel assembly that is particularly useful to modify conventional military vehicles for inclusion of central tire inflation systems. An annular sleeve is fixed to the hub of the wheel assembly so as to bridge the central cavity therein. A pair of sealing rings define an annular chamber between the sleeve and a spindle of the wheel assembly through which the axle rotates. The sealing rings have their outer periphery in contact with the sleeve and their inner peripheral surfaces riding on the spindle. This arrangement provides a simple yet reliable method of providing a sealed coupling between rotating and nonrotating portions of the wheel assembly. An air passageway between the interior and exterior portions of the wheel assembly is readily provided by way of a series of bores in the hub and spindle. The rotating coupling is thus provided without changing the bearing design or location, as well as eliminating the necessity of cutting into load bearing structures. Additionally, the seals are confined within the interior of the hub where they are protected from adverse environmental conditions.

BRIEF DESCRIPTION OF THE DRAWINGS

These and other advantages of the present invention will become apparent to one skilled in the art after reading the following specification and by reference to the drawings in which:

FIG. 5 is a view similar to FIG. 4 which schematically illustrates the pneumatic components of the control system.

BEST MODE FOR CARRYING OUT THE INVENTION

Figure 1:
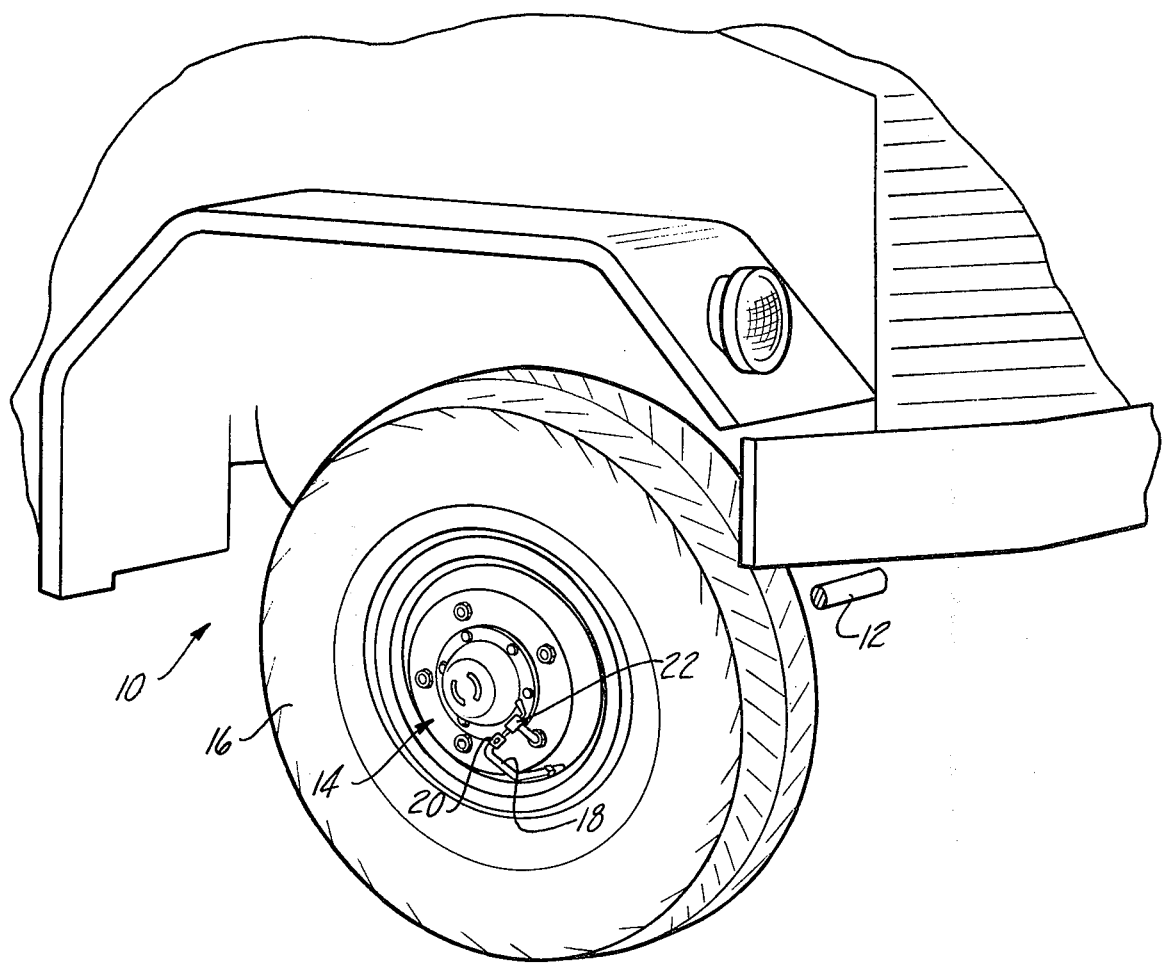
FIG. 1 is a perspective view of a wheel assembly mode in accordance with one aspect of this invention.

The present invention finds particular utility in connection with a military vehicle of the type shown in FIG. 1. Vehicle 10 may be a five ton M813 cargo truck built for the U.S. Army by AM General Corporation, the assignee of the present invention. In FIG. 1 a portion of vehicle 10 is shown illustrating a front axle 12 driving wheel assembly 14 onto which tire 16 is mounted. Also shown in FIG. 1 is an air line 18 having a conventional tire inlet valve stem 20 and a manual shutoff valve 22.

It should be understood from the outset that while this invention will be described in connection with a particular type of vehicle, the broader concepts embodied in this invention can be used in other types of vehicles such as buses, heavy duty trucks, vans and the like. Therefore, the particular embodiment described in this specification should not be construed to be a limiting example.

Figure 2:
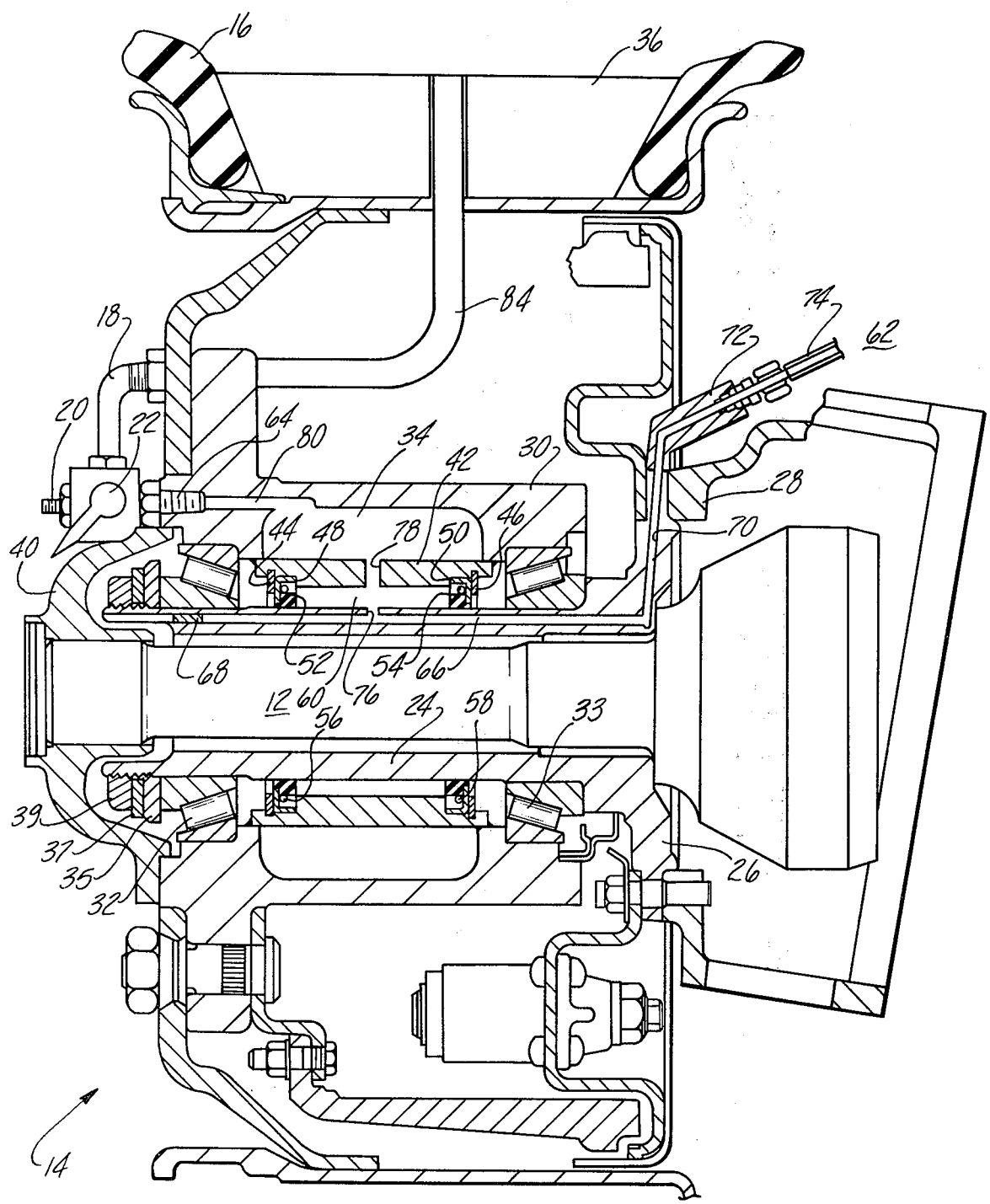
FIG. 2 is a cross sectional view of the wheel assembly shown in FIG. 1.
Figure 3:
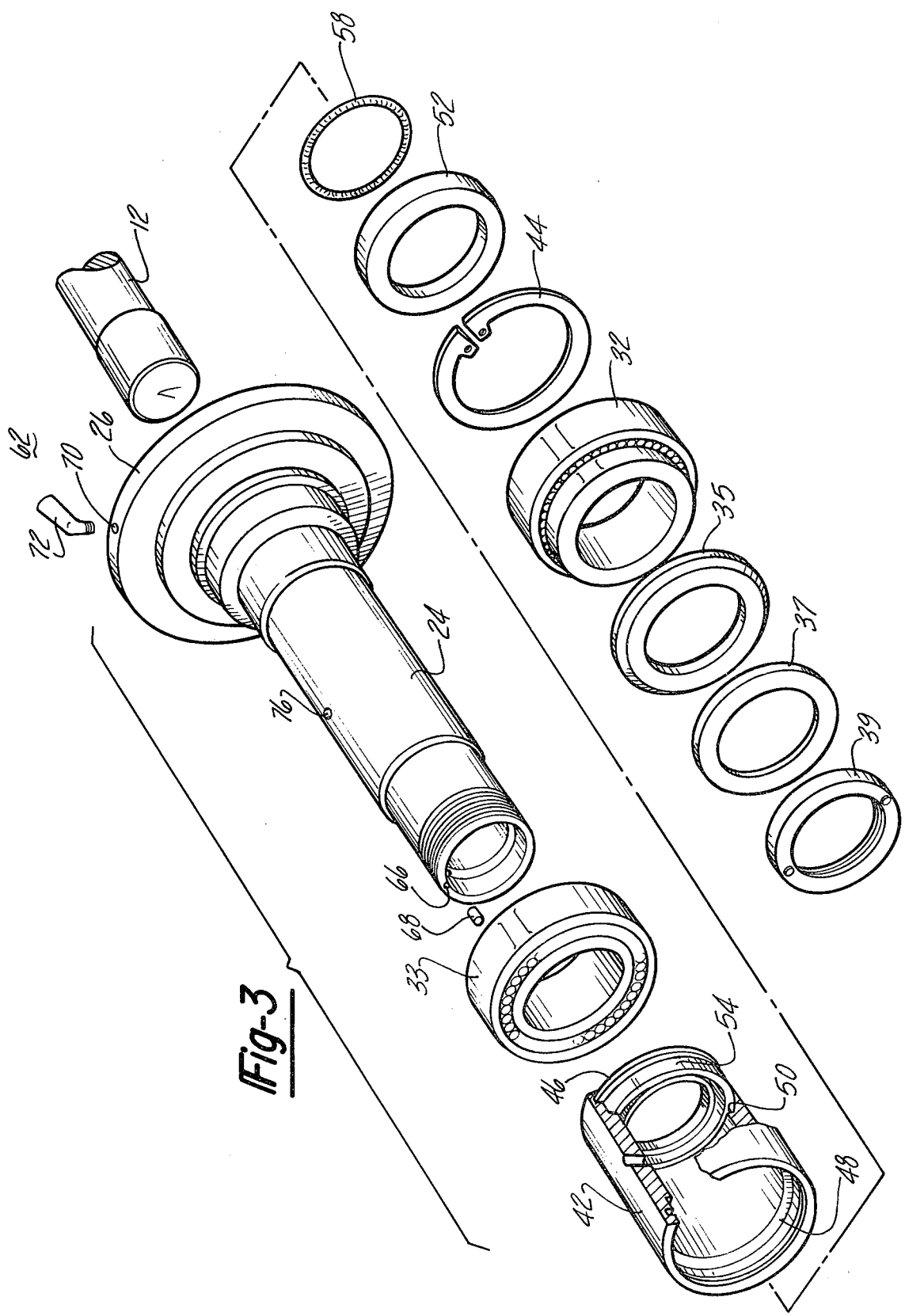
FIG. 3 is an exploded perspective view of portions of the wheel assembly.

Turning to FIGS. 2 and 3, wheel assembly 14 includes a tubular spindle 24 whose inboard portion expands somewhat to form a back flange 26. Spindle 24 is stationary, i.e., non-rotatable, since back flange 26 is bolted to the vehicle chassis 28. Hub 30 is mounted for rotation about spindle 24 by way of conventional bearings 32, 33. The left hand bearing 32 is held in place by way of members 35, 37, and 39. Hub 30 includes a centrally disposed cavity 34 therein. Tire 16 is mounted about the outer periphery of hub 30 using known techniques incorporating bead lock 36. Axle 12 passes through the hollow spindle 24. The inboard portion of axle 12, for a driven wheel, is coupled to a suitable source of rotational power such as a differential. The outer end of axle 12 includes splines (not shown) which engage corresponding slots in drive flange 40. Drive flange 40, in turn, is bolted to hub 30 to impart rotational movement to tire 16 in unison with the rotation of axle 12.

The wheel assembly thus far described is conventional. Pursuant to the present invention, wheel assembly 14 can be readily modified so as to provide a sealed rotating air coupling with a minimum amount of modification. An annular sleeve 42 has its outer edges connected, as by welding, to hub 30 so that the sleeve 42 generally bridges central cavity 34 in hub 30. The interior portions of sleeve 42 include two spaced grooves for receiving snap rings 44, 46. Sleeve 42 also provides shoulders 48 and 50 which oppose snap rings 44 and 46, respectively.

The pair of snap ring-shoulder combinations in sleeve 42 defines a seat for receiving the outer peripheral surfaces of sealing rings 52, 54. Sealing rings 52, 54 are open ended annular lip-type synthetic rubber seals which include garter springs 56, 58, respectively, to provide radially inwardly compressive forces on the inner peripheral surface of the seals which ride on the outer surface of spindle 24. This arrangement defines an interior chamber 60 which surrounds spindle 24.

Provision is now made for making a sealed air passageway between an inlet 62 in the non-rotating portion of wheel assembly 14 and an output 64 in the rotating hub 30. A first bore 66 is drilled in sleeve 24 throughout substantially its entire length, preferably by a rifle drilling technique. The left hand portion of bore 66 is sealed off with a plug 68. A second downwardly extending bore 70 in flange 26 is drilled until it meets the right hand portion of bore 66. A generally L-shaped fitting 72 is welded to the spindle to extend bore 70 so that it can be readily coupled to an air source delivered by hose 74. A generally orthogonally directed opening 76 extends between chamber 60 and the fire bore 66 in spindle 24. Sleeve 42 similarly includes an opening 78 so that air can communicate between chamber 60 and cavity 34. A third bore 80 is then drilled in hub 30 which extends into cavity 34 to provide a passageway between threaded outlet 64 and cavity 34.

Air supplied to inlet 62 passes through bores 70 and 66, then out of opening 76 in the stationary portion of the wheel assembly 14. The air next passes out of opening 76 and into chamber 60. Air is prevented from escaping to the outside environment by way of the sleeve 42 and air seals 52, 54 which rotate with hub 30. When there is compressed air in chamber 60 the air seals 52, 54 are urged against spindle 24 and their respective retaining rings 44, 46 thereby providing excellent protection from escape of the air. The air in chamber 60 passes through opening 78 into chamber 34 and thence through bore 80 to outlet 64.

Pursuant to a feature of this invention a manual shutoff valve 22 is connected to outlet 64. Downstream of shutoff valve 22 is a manual fill line or valve stem 20. Consequently, the user may manually fill tire 16 by closing shutoff valve 22 to block outlet 64 so that the air can be supplied externally through stem 20 which passes through time tube 18 back through hub 30 which, in turn, communicates with a line 84 which enters the interior portion of tire 16. Under normal operating conditions, however, the air to the tires is supplied automatically.

Figure 4:
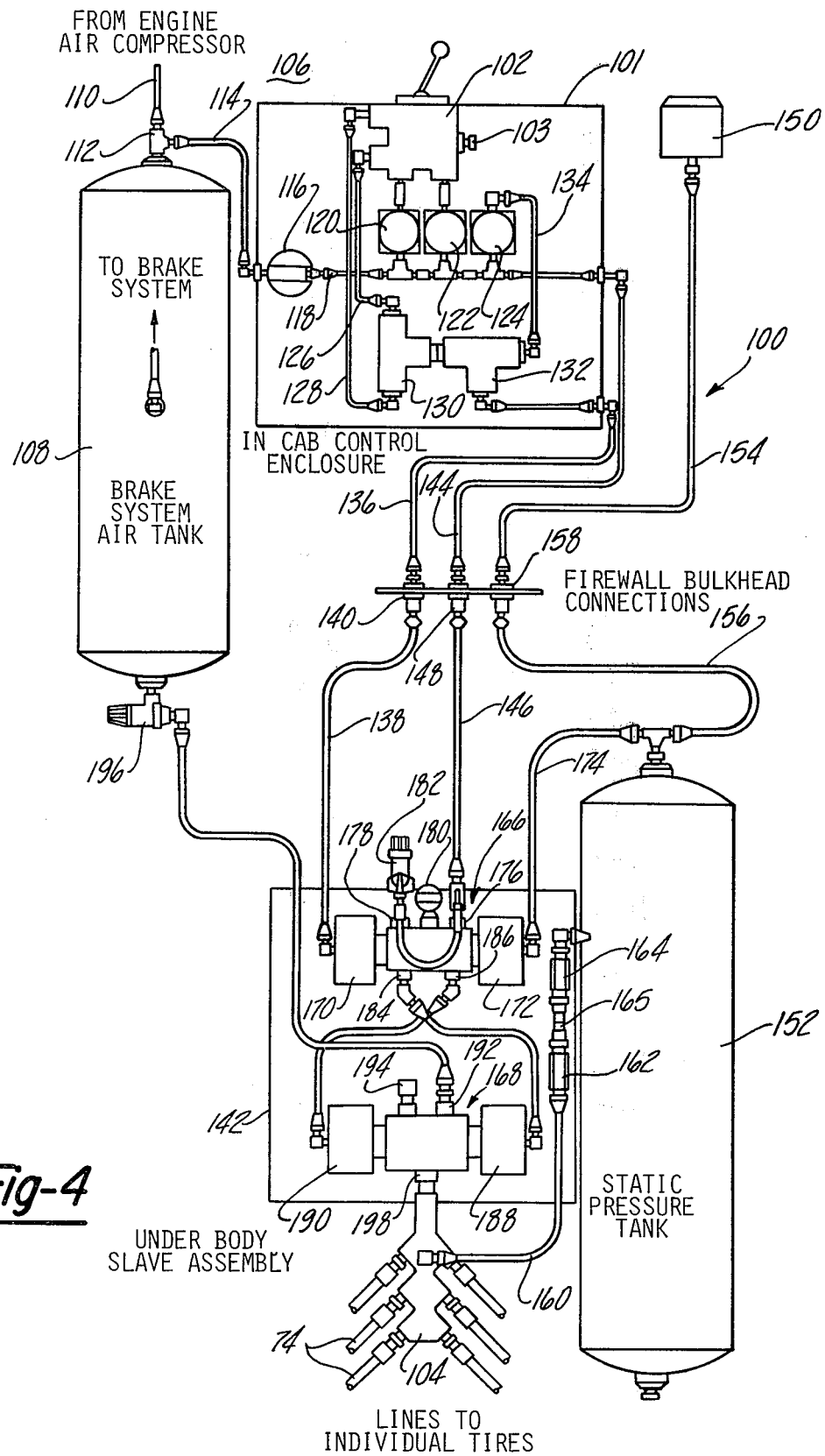
FIG. 4 is a view which pictorially illustrates the control system for regulating the air pressure in the tires pursuant to another aspect of this invention.

Turning now to FIGS. 4 and 5, the automatic control system 100 for regulating the air pressure to the various wheel assemblies will be described. FIG. 4 illustrates the control system in a pictorial manner whereas FIG. 5 schematically represents the various components therein using well known pneumatic symbols. Common elements in these two figures will be referenced by the same numeral where possible.

Like the wheel assembly feature of this invention, the control system is readily adapted for use in conventional military vehicles. In general, the control system employs a control box 101 which is mounted within the cab of vehicle 10. Depending upon the setting of a multi-positioned toggle valve 102, the system operates to inflate or deflate the tires by supplying or exhausting air through manifold 104 which is connected to the respective tires by way of hoses 74. In addition, the control system automatically maintains the tires at the preselected pressure thereby adjusting for increases or decreases in tire pressure due to punctures, increased operating temperatures, etc.

The sole source of air for the control system is from an air compressor 106 which is typically used to supply compressed air to an air tank 108 used in the vehicular air braking system. Air compressor 106 typically generates air pressures in line 110 of about 120 psi.

A minute amount of air from compressor 106 is used as pilot air to control the switching of the inflate/deflate valves. The air can be conveniently bled off from a fitting 112 on an air manifold under the dash which supplies air to the vehicle's accessories such as an air horn or windshield wipers. The term "pilot air" means that it is supplied from a source that is independent of the desired and actual pressure within the tires. The air from compressor 106 is fed through inlet line 114 to the control box in the vehicle cabin.

Inlet line 114 is connected to an air filter 116 which filters dirt and separates water from the air. The output of air filter 116 is connected to a check valve 118 to maintain a constant control pressure in the downstream side of the control system despite fluctuating air pressures delivered by air compressor 106 which can be caused by use of the air brakes or tire inflation. A set of three fixed pressure regulator devices are used to generate preset regulated pressures at their outlets. Pressure regulator device 120 is designed to provide 75 psi pressure at its outlet. Pressure regulator device 122 is designed for 30 psi while pressure regulator 124 generates 10 psi at its output.

The outputs of regulator devices 120 and 122 are connected to input ports of selector device 102. Selector device 102 is a three position toggle valve which operates in one position to connect the output of pressure regulator device 120 to the outlet line 126, while line 128 is exhausted. In a second position the outlet from the 30 psi pressure regulator 122 is connected to outlet line 128, while line 126 is exhausted. In a third position neither of the outputs from regulator devices 120 or 122 are connected to lines 126 or 128, but, instead, lines 126 and 128 are both exhausted through exhaust port 103.

Lines 126 and 128 are coupled to opposite sides of a shuttle valve 130, the output of which is connected to one side of shuttle valve 132. The opposite side of shuttle valve 132 is connected to the output of the 10 psi pressure regulator device 124 over line 134. Shuttle valves 130 and 132 operate under well known principles in which the higher of the two pressures at their inlets are coupled to their respective outlets. For purposes that will be explained later, shuttle valve 132 is biased at about 3 psi such that the air passage from regulator 124 will be closed until the pressure of the other side of valve 132 is 7 psi or less.

Thus, it can be appreciated that the pressure supplied at the outlet of shuttle valve 132 will either be 75, 30 or 10 psi depending upon the position of selector device 102. This selected pressure will be referred to as the control pressure and it is coupled over lines 136 and 138 through firewall bulkhead connection 140 to an inflate/deflate assembly 142. Pilot air is similarly delivered to assembly 142 over lines 144, 146 through bulkhead connection 148. If desired, a tire pressure gauge 150 can also be provided in the vehicle cab. Gauge 150 is connected to a static pressure tank 152 by way of lines 154, 156 through bulkhead connection 158. Static pressure tank 152 is at the current static pressure of the tires. Tank 152 is connected to the tires through manifold 104 by way of inlet line 160 which passes through in line air filters 162, 164 on either side of a fixed orifice 165 which restricts the flow to and from static pressure tank 152 so that the pressure in tank 152 is always the same as that in the tires.

The inflate/deflate assembly 142 employs two rolling diaphragm shuttle valves 166 and 168 which work in a master-slave relationship. Master valve 166 determines whether the tires should be inflated, deflated or remain unchanged as a function of the pressure differential between the desired control pressure and the static pressure within the tires. Slave valve 168 operates to deflate or inflate the tires in response to the control decision made by valve 166.

The inputs and outputs of valves 166 and 168 as well as their respective operations can be more easily understood by reference to the schematic of FIG. 5. In FIG. 5 the positions of the pneumatic components therein are all shown with no air pressure in the system, i.e. in a neutral position. With specific references to valve 166, its control inputs 170 and 172 are connected to the selected control pressure over line 138 and the static pressure of the tires over line 174 from static pressure tank 152, respectively. Valve 166 includes two input ports 176, 178 and an exhaust port 180. The pilot air over line 146 is connected directly to input port 176 but passes through a priority valve 182 before entering input port 178. Priority valve 182 is designed to close at pressures less than about 75 psi for the purposes that will later be explained.

Control valve 166 also includes two output ports 184 and 186 which in turn are connected to control inputs 188, 190, respectively, of valve 168. The arrows in the valves shown in FIG. 5 show the interconnections between the input ports and outputs ports that are made in the three stages of the valve operation. In the neutral stage where pressures on control inputs 170 and 172 are the same, the output ports 184 and 186 are connected back through to the exhaust port 180. When the pressure on control input 170 is greater than that on control input 172, pilot air from input port 176 is connected to output port 186 and output port 184 is connected to exhaust port 180. In contrast, if the static pressure on control input 172 is greater, then the pilot air passing by way of priority valve 182 through input port 178 is connected to output port 184, with output port 186 being exhausted through exhaust port 180.

Valve 168 operates under the same principles. It includes one input port 192 and an exhaust port 194. Input port 192 is connected to the output of the brake system air tank 108 through a priority valve 196. Priority valve 196 operates to close when the pressure within tank 108 falls to below about 75 psi for the reasons that will be explained later herein. The output port 198 of valve 168 is connected to manifold 104 which, as stated before, is connected to the tires through the wheel assemblies 14. When the pressure at control input 190 is greater than that of 188, valve 168 operates to couple the pressurized air from tank 108 through input port 192 to output port 198 to thereby inflate the tires. In contrast, when control input 188 is supplied with higher pressure, the output port 198 is connected to the exhaust port 194 so that the tires are deflated. When the pressures on control inputs 190 and 188 are the same, no inflation or deflation of the tires occurs.

Industrial Applicability

When the engine of vehicle 10 begins running the compressor 106 fills air tank 108 to a pressure of about 90 psi whereupon priority valve 196 opens making air available for tire inflation. Normally, the pressure in tank 108 can increase to a maximum of 120 psi. If the pressure in the brake tank 108 falls below about 75 psi, priority valve 196 closes thereby permitting pressure in the brake tank to build up to a safe operating pressure for the brake system which takes priority over the tire inflation system. Priority valve 196 also insures priority air to the brake system in the event of a major tire system failure.

To inflate or deflate the tires the user places toggle valve 102 into one of the three preset positions. Preferably, the valve 102 is labeled according to terrain or road conditions: one setting (70 psi) for highway conditions, a second setting (30 psi) for cross country, and a third position (10 psi) for mud, sand or snow operation.

Assume that the tires are inflated to 10 psi and the operator switches toggle valve 102 to the position associated with 75 psi. The control system will automatically inflate the tires and maintain them at this pressure without further manual intervention.

The output of the 75 psi pressure regulator 120 is connected by the selected setting of toggle valve 102 to output line 126. Shuttle valve 130 allows only the higher pressure of lines 128 and 126 to pass through, which in this case is 75 psi. Priority shuttle valve 132 similarly allows only the higher of the 10 psi pressure on line 134 or the output of valve 130 to pass through. Consequently, the 75 psi pressure becomes the new control pressure which is coupled via line 138 to the control input 170 of valve 166. Since the right hand control input 172 is at 10 psi (the current static pressure of the tires) valve 166 shuttles to connect pilot air from line 146 through input port 176 and output port 186 to the control input 190 of valve 168. The right hand control input 188 of valve 168 is connected to the exhaust port 180 of valve 166. Since the left hand control input 190 is at a greater pressure than the right hand control input 188, valve 168 shuttles to connect the pressurized air from air tank 108 through port 192 to outlet 198 which, in turn, is coupled to manifold 104. The air is thus allowed to flow into the tires and into static pressure tank 152. The flow through restriction of the fixed orifice 165 is such that the pressure in static tank 152 is the same as any and all tires at all times. When the tires are inflated to 75 psi the pressure in tank 152 is likewise at 75psi. Thus, the right hand control input 172 of valve 166 now is at the same pressure as the left hand control input 170. This places the system in balance such that valve 166 shuttles to the neutral position (as shown in FIG. 5) and blocks further pilot air from being supplied to the control inputs of valve 168. Thus, valve 168 also shuttles to the neutral position closing off further communication between rank 108 and manifold 104.

Assume that the vehicle now is on soft terrain and the user switches selector device 102 to the third (10 psi) position. With selector device 102 in this position (as shown in FIG. 5) lines 128 and 126 are coupled to the exhaust port 103 of shuttle valve 102. This permits the 75 psi pressure in the lines leading to control input 170 of valve 166 to be released back through the exhaust port 103. The released downstream pressure in shuttle valve 132 must fall below about 7 psi before valve 132 shuttles to allow the accurately controlled 10 psi air from pressure regulator 124 to instead pass through to control valve 166. This produces an accurate 10 psi control pressure that may not otherwise be possible with a standard (unbiased) shuttle valve in this position due to hystersis effects.

With 10 psi now applied to control input 170 of valve 166 and 75 psi still applied to the right hand control input 172, the system no longer is in balance. Control valve 166 is then shuttled to the left connecting pilot air from input port 178 to outlet port 184 which is connected to the right hand control input 188 of valve 168. This causes valve 168 to similarly shuttle to the left to connect manifold 104 to the exhaust port 194. In such manner air is allowed to flow from the tires and static pressure tank 152 into the atmosphere until the pressures on both sides of control valve 166 are the same, i.e. 10 psi. At that time valve 166 shuttles to its neutral position cutting off pilot air to valve 168 which, in turn, also shuttles to its neutral position cutting off all air flow. The control pressure, the pressure in the tires, static tank pressure and tire pressure gauge are now all equal to 10 psi.

Provision is also made for preventing unwanted tire deflation in the event that there is a loss of air pressure which controls the valving arrangement of the control system. This pressure loss can possibly occur when the vehicle is parked for a period of time causing the brake tanks to bleed down creating a pressure loss. Also, a break in the control lines would cause a loss of control pressure. Under these conditions, priority valve 182 prevents unwanted tire deflation. Priority valve 182 is connected between the pilot air line 146 and the inlet port 178 of valve 166 which is used in the deflate mode to provide pressure to the right hand control input of valve 168. Priority valve 182 is designed to close at 75 psi. Accordingly, if the pilot air pressure should drop below 75 psi, no pilot air would pass through valve 166 to valve 168 thereby preventing valve 168 from shuttling to the deflate stage.

It should also be realized that the control system of the present invention automatically maintains the preselected desired air pressure within the tires even though conditions in the tires may change. For example, if there is a slow leak or puncture in the tires, static pressure tank 152 will fall below the preselected pressure thereby causing valve 166 and 168 to enter into the inflate mode as necessary to maintain the desired pressure. Similarly, if the temperature in the tires increases so as to increase the pressure therein beyond the preselected temperature, the valving arrangement of the control system of the present invention will automatically deflate the tires until the desired pressure is reached. All this is accomplished without any further manual intervention from the operator.

Those persons experienced in the art can now appreciate that the present invention offers several significant advantages over known central tire inflation systems. The present system is truly automatic and requires no operator intervention aside from moving the toggle switch to the position associated with the terrain on which the vehicle is riding. Once the selection has been made the system automatically adjusts and maintains the tires at that selected pressure. The system also operates very quickly. It is capable of deflating all of the tires (six 14.00×20 tires) to 10 psi from 75 psi in three minutes and forty seconds, much more quickly than known inflation systems. This is because the slave valve 168 is quickly shuttled to its full operational positions once the inflate/deflate decision has been made by master valve 166. Both the wheel assembly and air regulating control system are extremely cost effective utilizing a minimum number of components. Additionally, the tire inflation system of the present invention can be readily adapted to conventionl military vehicles with a minimum amount of modification. All of these advantages result while at the same time providing excellent reliability even under adverse conditions. The rotating air coupling of the present invention is isolated from adverse road conditions since it is interiorly located and it is provided without cutting into load bearing structures or disturbing the wheel bearings.

Other modifications of the present invention will become apparent to one skilled in the art after a study of the drawings, specification, and following claims.

We claim:

1. In an automatic tire inflation system for a vehicle, the improvement comprising:
   first means coupled to the tires for providing an output associated with the actual tire pressure;
   manually actuable selector means in the vehicle cabin for generating an output associated with one of a plurality of tire pressures that may be desired for the vehicle under various operating conditions;
   control means adapted to receive the outputs from the first means and selector means, operative to automatically adjust and constantly maintain the pressure in the tires at the desired pressure without further manual intervention as a function of the differential between said outputs associated with the actual and desired pressures.

2. The improvement of claim 1 wherein said selector means includes a multi-position toggle valve.

3. The improvement of claim 2 wherein said control means comprises:
   air compressor means for supplying compressed air;
   a plurality of pressure regulators corresponding in number to the number of positions of said toggle valve said pressure regulators having inlets coupled for receipt of a portion of said air from the compressor and being adapted to provide preselected fixed air pressures at their respective outlets;
   means cooperating with the toggle valve for coupling the fixed air pressure from one of the pressure regulators to a first line to serve as control pressure as a function of the position of the toggle valve;
   inflate/deflate assembly means including a first shuttle valve having first and second control inputs, an inlet port, and first and second outlet ports, operative to selectively connect said inlet port to said first and second outlets depending upon the relative pressure between the first and second control inputs; said first control input being coupled to said first line supplying the control pressure, said second control input being connected to the static pressure within the tires, said input port being connected for receipt of pilot air over a second line from the compressor whereby said first shuttle valve operates to couple the pilot air to said second outlet port when the control pressure exceeds the static pressure, and further operates to couple the pilot air to said first outlet port when static pressure exceeds th desired control pressure, with pilot air being blocked from either of the outlet ports when the control pressure and static pressure are in equilibrium;
   said inflate/deflate valve assembly means further including a second shuttle valve having first and second control inputs coupled to the second and first outlet ports of the first shuttle valve, respectively, said second shuttle valve having an input port coupled to said air compressor, an exhaust port, and an outlet port coupled to inlets for each tire, whereby said compressed air is coupled to said tires to inflate same when pilot air is coupled to the first control input, and wherein said exhaust port is coupled to said tires for deflating same when the pilot air is coupled to the second control input of the second shuttle valve.

4. The improvement of claim 1 wherein said static pressure is supplied by a static pressure tank coupled between the inlets to the tires and the second control input of the first shuttle valve and wherein a fixed orifice is provided between the tire inlets and the tank to maintain the pressure in the tank at the same pressure as in the tires.

5. The improvement of claim 3 wherein said air compressor is coupled to an air brake system air tank whose outlet is coupled to the input port of said second shuttle valve.

6. The improvement of claim 5 which further comprises a priority valve connected to the outlet of the brake system air tank, operative to prevent air pressure therefrom to be diverted to the tires when the pressure in the air tank falls below a given pressure.

7. The apparatus of claim 3 wherein said means cooperating with the toggle valve comprises: a third shuttle valve having a first input connected for selective receipt of a given high pressure from a first pressure regulator and a second input coupled for selective receipt of a given medium pressure from a second pressure regulator, operative to provide at its outlet the higher of the two pressures supplied to its input; and a fourth shuttle valve having a first input connected to the output of said third valve and a second input connected for receipt of a given low pressure from a third pressure regulator, said fourth valve having an outlet connected to the first line to provide said control pressure which is the higher of the two pressures applied to its inputs, said fourth valve being biased towards said third pressure regulator input so as to pass said low pressure as the control pressure only after the pressure on the first input has fallen significantly below the given low pressure.

8. The improvement of claim 7 wherein said toggle valve includes an exhaust port which is connected to the control input of the first shuttle valve when the low pressure setting is selected whereby the higher pressure at the control input is released back through first line, fourth valve, third valve and then out of exhaust port, with the low pressure then passing through fourth valve after the released pressure has fallen significantly below the selected low pressure.

9. The apparatus of claim 3 wherein said first shuttle valve further includes a second inlet port, first and second inlet ports being coupled by way of the first shuttle valve to the first and second control inputs of second shuttle valve, respectively; the first input port being connected for receiving pilot air substantially directly from the air compressor, with said second input port receiving said pilot air through a second priority valve connected between the second input port and the air compressor, said priority valve being adapted to prevent pilot air from entering the second control input of said shuttle valve if the pilot air falls below a given pressure thereby preventing unwanted deflation of the tires in the event of system pressure loss.

10. In an automatic tire inflation system, the improvement comprising:
an inflate/deflate valving assembly for quickly inflating or deflating the tires, said assembly including first and second interconnected shuttle valve means operating in a master-slave relationship, said first valve being operative to selectively supply pilot air to control the positioning of the second valve depending on the pressure differential between actual and desired tire pressures applied to said first valve said second valve being responsive exclusively to the pilot air to either completely shuttle to one position for inflating the tires or to another position for deflating the tires.

11. The improvement of claim 10 wherein said actual tire pressure is provided by way of a static pressure tank connected to the tires through a restricted orifice.

12. A central tire inflation system for a vehicle comprising:
a control box mounted in a cabin of the vehicle, said control box including a multi-positioned toggle valve, a plurality of pressure regulators for providing fixed air pressures, a first outlet line for supplying one of the fixed air pressures, and a second outlet line for supplying pilot air;
a brake system air tank;
a manifold having an inlet and a plurality of outlets providing connections to the tires;
a static pressure tank connected through a fixed orifice to the manifold, and
an inflated/deflate assembly including a first shuttle valve with a first control input connected to the first line and a second control input connected to an output of the static pressure tank, operative to selectively supply pilot air from the second line to a first output port or second output port depending upon the pressure differential between its control inputs; a second shuttle valve with a first control input connected to the second output port of the first valve and a second control input connected to the first output port, said second valve having an exhaust port, an input port connected to an output of said brake tank, and an output port connected to the inlet of said manifold, operative to selectively connect the manifold to the brake tank for inflating the tires or to the exhaust port for deflating the tires as a function of the pilot air supplied to its control inputs.

13. In an automatic tire inflation system having a plurality of wheel assemblies for the tires in a vehicle, each wheel assembly having a rotatable hub portion connected to its associated tires and a non-rotatable portion connected to the vehicle, and means defining a sealed air passageway between an inlet in the nonrotatable portion and an outlet in the rotatable portion, the improvement comprising:
an air line connected between said output in each wheel assembly and its associated tire, an inlet valve stem in said line for manually supplying air to the tire from an external source, and a manually actuable shut off valve between the stem and the outlet from the hub to selectively prevent air from passing between the tire and air passageway in the hub when desired.

14. A central drive inflation system for a vehicle comprising:
control means mounted in a cabin of the vehicle for generating an output associated with a desired air pressure for the tires;
a source of pilot air;
tire pressure monitoring means for providing an output associated with the actual pressure within the tires;
shuttle valve means having a first control input and a second control input, operative to shuttle to one position to apply compressed air to the tires for inflating same and to shuttle to another position to exhaust air from the tires for deflating same; and
means for selectively coupling the source of pilot air to one of the control inputs of the shuttle valve means to cause rapid shuttling thereof as a function of the outputs from the control means and tire pressure monitoring means.

* * * * *

UNITED STATES PATENT AND TRADEMARK OFFICE
CERTIFICATE OF CORRECTION

PATENT NO. : 4,418,737
DATED : December 6, 1983
INVENTOR(S) : Fred L. Goodell & Michael Ellison It is certified that error appears in the above-identified patent and that said Letters Patent are hereby corrected as shown below:

Column 4, line 47 "output" should be --outlet--

Column 5, line 13 "time tube" should be --tube--

Column 8, line 23 "rank" should be --tank--

Column 10, line 30 "th" should be --the--

Claim 13, line 34 "output" should be --outlet--

Claim 14, line 43 "drive" should be --tire--

Signed and Sealed this

Twenty-fourth Day of April 1984

[SEAL]

Attest:

GERALD J. MOSSINGHOFF

Attesting Officer  Commissioner of Patents and Trademarks